United States Patent [19]

Akita

[11] Patent Number: 4,600,959

[45] Date of Patent: Jul. 15, 1986

[54] TAPE MEASURING METHOD

[75] Inventor: Shinichi Akita, Tokyo, Japan

[73] Assignee: Nippon Precision Circuits Ltd., Tokyo, Japan

[21] Appl. No.: 470,531

[22] Filed: Feb. 28, 1983

[30] Foreign Application Priority Data

Mar. 3, 1982 [JP] Japan .................................. 57-33703

[51] Int. Cl.[4] ........................ G11B 15/18; G11B 27/10
[52] U.S. Cl. ..................................... 360/137; 360/72.1
[58] Field of Search ............... 360/137, 72.1; 242/186, 242/191

[56] References Cited

U.S. PATENT DOCUMENTS 4,347,538  8/1982  Klank .................................. 360/137

*Primary Examiner*—S. J. Heinz
*Attorney, Agent, or Firm*—Robert E. Burns; Emmanuel J. Lobato; Bruce L. Adams

[57] ABSTRACT

A characteristic curve indicative of a correlation between the ratio of rotational periods of tape supply and takeup reels and a remaining time or elapsed time for a running tape is approximated by straight lines, and clock pulses having frequencies corresponding to the slopes of the straight lines are counted by counters to measure the remaining or elapsed time. With this arrangement, the remaining time or elapsed time for the tape can be measured simply by counting clock pulses with a series of counters, without resorting to a complex arithmetic circuit.

1 Claim, 3 Drawing Figures

TAPE MEASURING METHOD

BACKGROUND OF THE INVENTION

The present invention relates to a tape measuring method, and more particularly to a method for measuring a remaining time or an elapsed time for a running magnetic recording tape with a relatively simple circuit arrangement.

It is known in the art of ordinary magnetic tape recording and playback apparatus that there is a certain correlation between the ratio of the rotational periods of tape supply and takeup reels and the remaining time or the elapsed time for a running tape. Thus the following equations are given:

$$L_1 \approx \frac{\pi}{\Delta r}(r_1^2 - r^2) \quad (1)$$

$$L_2 \approx \frac{\pi}{\Delta r}(r_2^2 - r^2) \quad (2)$$

$$r_1/r_2 = t_2/t_1 \quad (3)$$

where $r$ is the radius of a hub, $r_1$ is the radius of a tape roll wound on a supply reel, $r_2$ is the radius of a tape roll wound on a takeup reel, $L_1$ and $L_2$ are the tape lengths on the supply and takeup reels, $t_1$ and $t_2$ are the periods of rotation of the supply and takeup reels, and $\Delta r$ is the thickness of the tape. The length of the remaining tape can be derived from the above equations (1) through (3) as follows:

$$L_1 = \frac{\Delta r \cdot L_0 + \{1 - (t_1/t_2)^2\}\pi r^2}{\{(t_1/t_2)^2 + 1\}\Delta r} \quad (4)$$

where $L_0 = L_1 + L_2$ (the total length of the tape). The remaining time T for the tape is given as follows:

$$T = L_1/v \quad (5)$$

where $v$ is the transfer speed of the tape. The remaining time can be expressed as the curve $l_1$ (FIG. 1) from the ratio ($t_1/t_2$) between the rotational periods of the supply and takeup reels.

The length $L_2$ of the tape that has transferred can be derived as follows:

$$L_2 = \frac{L_0 \cdot \Delta r(t_1/t_2)^2 + \{(t_1/t_2)^2 - 1\}\pi r^2}{\{(t_1/t_2)^2 + 1\}\Delta r} \quad (6)$$

The elapsed time for the running tape can be expressed as the curve $l_2$ (FIG. 1).

One way to measure the remaining time or the elapsed time for the tape from the equation (4) or (5) through measuring the periods $t_1$, $t_2$ would be to effect an arithmetic operation using the equation with the periods $t_1$, $t_2$ measured. This process would require a computer, could not measure the periods $t_1$, $t_2$ simultaneously, and would take an increased interval of time because of the arithmetic operation to be carried out. An interface for allowing input signals to be supplied to a display unit would be complex and costly. Other arithmetic and control circuits would be necessary for simultaneous implementation of a tape counter, a timer switch, and the like.

Another process would be to prepare in advance a data table of numerical data from the equation (4) or (6), and read out of the data table such data which correspond to a remaining time or an elapsed time based on the result of an experiment. This procedure, however, would lead to an extremely large size of such a data table, and hence would be expensive.

SUMMARY OF THE INVENTION

A first object of the present invention is to provide a tape measuring method capable of tape measurement regardless of how fast or slow the tape is transferring.

A second object of the present invention is to provide a tape measuring method which can determine a remaining time or an elapsed time for a running tape simply by effecting counting operations without requiring complex arithmetic operations.

A third object of the present invention is to provide a tape measuring method capable of determining a remaining time or an elapsed time for a running tape as precisely as possible by approximating a characteristic curve with a plurality of straight lines.

According to the present invention, a method for measuring a tape from a supply reel to a takeup reel comprises the steps of approximating a plurality of straight lines to a characteristic curve indicative of a correlation between the ratio of the rotational periods of said supply and takeup reels and a remaining time or an elapsed time for the tape, generating clock pulses of a first frequency and other clock pulses having a plurality of frequencies, said first and plurality of frequencies having ratios corresponding to the slopes of said plurality of straight lines, measuring the remaining time or the elapsed time for the tape by counting the product of said ratio of rotational periods and the slopes of said straight lines by using said clock pulses and signals in response to rotation of said supply and takeup reels.

The above and other objects, features and advantages of the present invention will become more apparent from the following description when taken in conjunction with the accompanying drawings in which a certain preferred embodiment of the invention is shown by way of illustrative example.

DESCRIPTION OF THE PREFERRED EMBODIMENT

Figure 1:
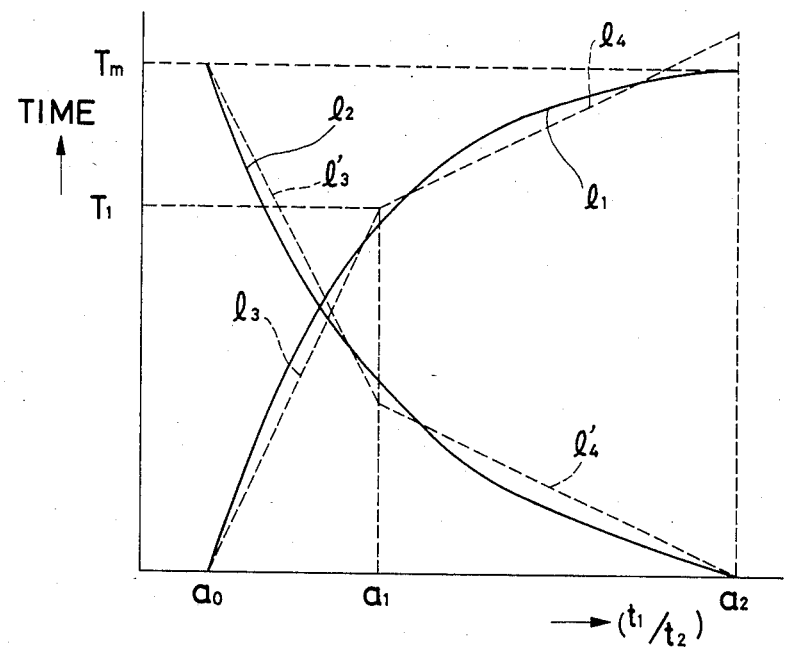
FIG. 1 is a graph showing characteristic curves for the ratio of the rotational periods of supply and takeup reels and a remaining time and an elapsed time for a running tape, and straight lines approximating the curves.

The principles of operation of a tape measuring method of the present invention will first be described. For the measurement of a remaining time for a running tape, it is assumed that a curve $l_1$ shown in FIG. 1 is approximated by straight lines $l_3$, $l_4$ which have slopes $\alpha$, $\beta$, respectively. The remaining time T in the interval beween $a_0$ and $a_1$ is expressed by:

$$T = \alpha(t_1/t_2 - a_0) \quad (7)$$

-continued $$= \alpha(t_1/t_2) - \alpha \cdot a_0$$

where $a_0$ is the minimum value of the ratio $(t_1/t_2)$ of the rotational periods and depends solely on the overall length of the tape, the thickness of the tape, the diameter of the reel hubs, and other factors.

With the ratio of the rotational periods lying between $a_1$ and $a_2$, the remaining time is proportional to the slope $\beta$ of the straight line $l_4$.

Three frequencies $F$, $F_1$, $F_2 (F > F_1, F_2)$ are produced which express the slopes $\alpha$, $\beta$ of the straight lines as follows:

$$\alpha = F_1/F, \ \beta = F_2/F$$

The remaining time in the interval between $a_0$ and $a_1$ can now be given as follows:

$$T = \frac{F_1}{F} \cdot \frac{t_1}{t_2} - \alpha \cdot a_0 \quad (8)$$

The remaining time is measured on the basis of the equation (8) as follows:

The frequency $F$ is counted during the time $t_2$, and the values $t_2 \cdot F$ are used as a frequency division ratio of a programmable counter.

The programmable counter is then supplied with the frequency $F_1$ or $F_2$ during the time $t_1$ to produce output pulses having a frequency of $$\frac{F_1}{F \cdot t_2} \text{ or } \frac{F_2}{F \cdot t_2}.$$

The remaining time can be determined by counting with a counter pulses having the frequency of $$\frac{F_1}{F \cdot t_2}$$

as long as the remaining time is shorter than $T_1$. When the remaining time exceeds $T_1$ and enters the area of the straight line $l_4$, then the programmable counter is supplied with the frequency $F_2$. The constant $\alpha \cdot a_0$ in the equation (8) is set in the counter in advance so that the constant $\alpha \cdot a_0$ will be subtracted from a content in the counter.

Thus, the remaining time can be determined simply by effecting counting operation in the counter without requiring a complex arithmetic operation. Such an arrangement is capable of high-speed processing and is much less expensive than the aforedescribed techniques.

Figure 2:
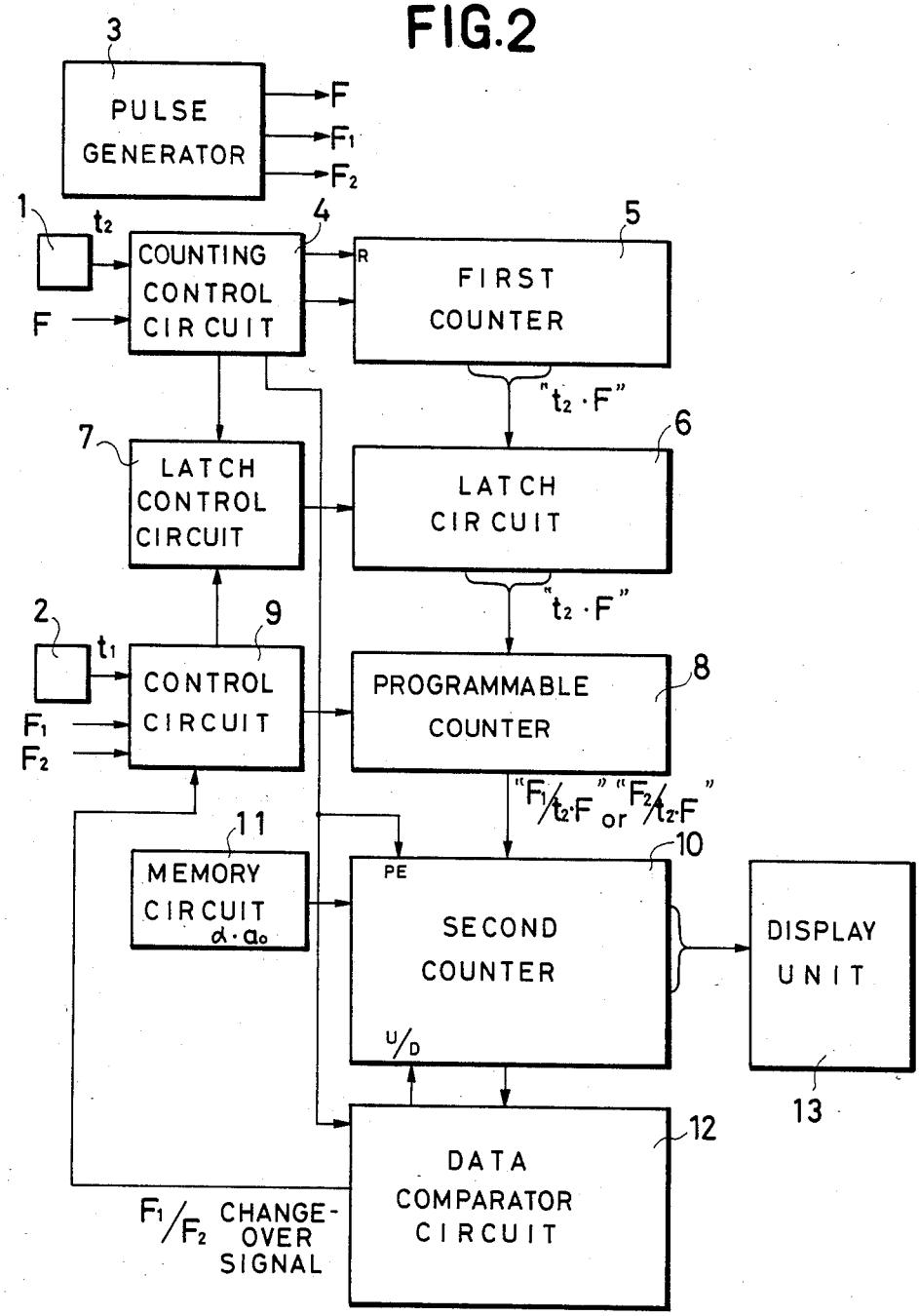
FIG. 2 is a block diagram of a tape measuring device according to the present invention.

A specific construction for performing the foregoing measurement will now be described. As shown in FIG. 2, signal generators 1, 2 detect rotation of the supply and takeup reels, respectively to produce one pulse, for example, while each reel makes on revolution, a pulse generator 3 generates clock pulses having frequencies $F$, $F_1$, $F_2$, and a counting control circuit 4 allows passage of the clock pulses of the frequency $F$ during the period $t_2$ of rotation of the takeup reel. The tape measuring device also includes a first counter 5, a latch circuit 6, a latch control circuit 7, a programmable counter 8, a control circuit 9, a second counter 10 which in the illustrated embodiment comprises a presettable up-down counter, and a memory circuit 11 for storing the constant $a_0 \ \alpha \cdot a_0$ in the equation (8). A data comparator circuit 12, in which a remaining time $T_1$ is set for a point where changeover from the straight line $l_3$ to the straight line $l_4$ (FIG. 1) is effected, serves to change the frequencies of the clock pulses supplied to the programmable counter 8 and also to effect switching between count-up and count-down modes of the counter 10. The remaining time determined is indicated on a display unit 13.

Operation of the above device thus constructed is as follows: When one pulse is produced by the signal generator 1, the counting control circuit 4 generates a reset pulse to clear the counter 5 and to preset the constant $\alpha \cdot a_0$ in the counter 10. Simultaneously, the counter 10 enters a count-down mode in response to an output from the data comparator circuit 12.

The counting control circuit 4 also supplies clock pulses of the frequency $F$ to the counter 5 until the counting control circuit 4 is supplied with a next pulse from the signal generator 1. Contents $t_2 \cdot F$ of the counter 5 is latched in the latch circuit 6 by an output from the latch control circuit 7, whereupon the frequency division ratio of the programmable counter 8 is set to be $1/t_2 \cdot F$. A pulse which first comes from the signal generator 2 after such a ratio setting operation enables the control circuit 9 to supply clock pulses of the frequency $F_1$ to the programmable counter 8 during the time interval $t_1$. Since the frequency division ratio of the programmable counter 8 is $1/t_2 \cdot F$ at this time, the programmable counter 8 supplies pulses having a frequency of $F_1/t_2 \cdot F$ to the counter 10 during the time interval $t_1$. As described above, the counter 10 has the constant $\alpha \cdot a_0$ set as an initial value and is in the count-down mode. Therefore, the counter 10 counts down to 0 when it is supplied with $\alpha \cdot a_0$ pulses. The contents 0 of the counter 10 is detected by the data comparator circuit 12, which then causes the counter 10 to operate in the count-up mode. The above operation is tantamount to subtraction of the constant $\alpha \cdot a_0$ in the equation (8).

Thereafter, the counter 10 is responsive to pulses from the programmable counter 8 to count the remaining time along the straight line $l_3$ shown in FIG. 1. If the remaining time is less than $T_1$, then clock pulses from the control circuit 9 cease before the counter 10 starts counting $T_1$, and the contents in the counter 10 at this time are indicated as the remaining time on the display unit 13.

If, on the other hand, the remaining time is longer than $T_1$, then the data comparator circuit 12 generates a changeover signal when the counter 10 counts $T_1$ to cause the control circuit 9 to issue clock pulses having the frequency $F_2$. Thus, the programmable counter 8 produces pulses of a frequency of $F_2/t_2 \cdot F$, and the counter 10 counts the remaining time along the straight line $l_4$ in FIG. 1. The contents in the counter 10 are displayed as the remaining time on the display unit 13.

The above description has been directed to the measurement of a remaining time. An elapsed time can also be measured on the basis of the curve $l_2$ of FIG. 1. For such a measurement, the curve $l_2$ is approximated by straight lines $l'_3$, $l'_4$ having slopes $(-\alpha)$, $(-\beta)$, respectively. With an elapsed time having a maximum value $Tm$, an elapsed time $T'$ during the interval $a_0 - a_1$ can be expressed as follows:

$$T' = Tm - \alpha(t_1/t_2 - a_0)$$
$$= -\alpha(t_1/t_2) + Tm + \alpha \cdot a_0$$

Thus, the elapsed time can be determined in substantially the same manner as that for measuring the remaining time, except that the memory circuit 11 stores the constant $(T_m + \alpha \cdot a_0)$ and the counter 10 is in the form of a down counter. More specifically, the constant $(T_m + \alpha \cdot a_0)$ is preset as an initial value in the down counter. The elapsed time is measured along the straight line $l'_3$ with clock pulses of the frequency $F_1$ being selected until the count in the down counter reaches $T_1$. When the elapsed time exceeds $T_1$, clock pulses of the frequency $F_2$ are selected for continued measurment along the straight line $l'_4$.

While in the above embodiment the remaining time or the elapsed time is measured using the ratio $(t_1/t_2)$ of the rotational periods, the reciprocal $(t_2/t_1)$ of the ratio may be employed for the measurement. For such a measurement, the length $L_2$ of the tape that has transferred and the length $L_1$ of the tape that remains are expressed as follows:

$$L_2 = \frac{\Delta r \cdot L_0 + \{1 - (t_2/t_1)^2\}\pi r^2}{\{(t_2/t_1)^2 + 1\}\Delta r}$$

$$L_1 = \frac{(t_2/t_1)^2 \cdot L\Delta r + \{(t_2/t_1)^2 - 1\}\pi r^2}{\{(t_2/t_1)^2 + 1\}\Delta r}$$

Figure 3:
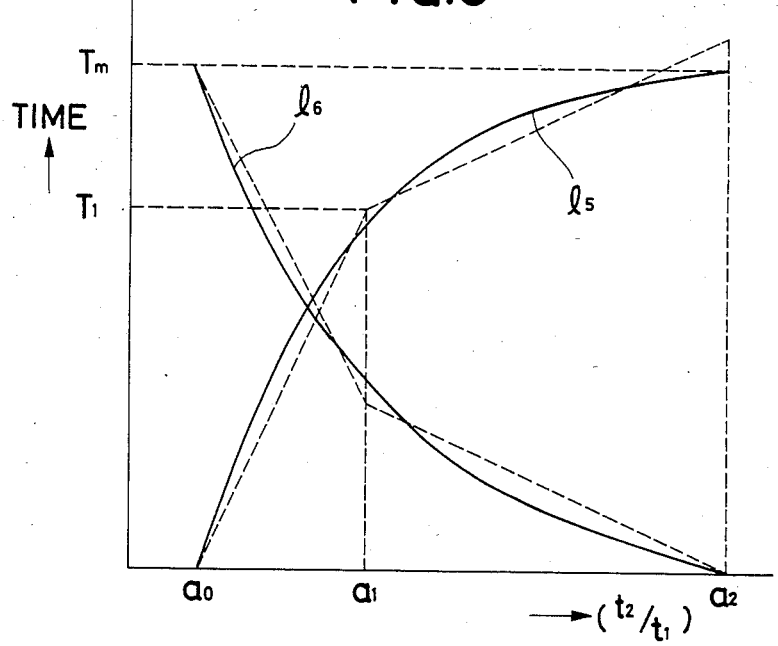
FIG. 3 is a graph showing characteristic curves for the reciprocal of the ratio shown in FIG. 1 and the remaining and elapsed times, and straight lines approximating the curves.

The elapsed time is expressed as a curve $l_5$ in FIG. 3 (which is the same as the curve $l_1$ in FIG. 1), and the remaining time is expressed as a curve $l_6$ in FIG. 3 (which is the same as the curve $l_2$ in FIG. 1). Therefore, the elapsed and remaining times can be measured exactly in the same manner as that for measuring the remaining and elapsed times in the foregoing embodiment by changing around the signal generators 1, 2 (FIG. 2) and by supplying the output from the signal generator 1 for the supply reel to the control circuit 9 and also supplying the output from the signal generator 2 for the takeup reel to the counting control circuit 4.

While in the above embodiment a characteristic curve is approximated by two straight lines, it may be approximated by three or more straight lines for more accurate measurements, and unit intervals of time may be reduced as much as possible.

With the arrangement of the present invention, a remaining time or an elapsed time for a running tape is measured on the basis of the ratio of the periods of rotation of the supply and takeup reels irrespective of how fast or slow the tape is running. Since no complicated arithmetic operation is needed and measurements can be effected simply by counting pulses, the tape measuring device can effect highspeed processing and is less costly to construct. The tape measuring device for carrying out the method of the invention is composed of a special purpose circuit which employs no microcomputer, requires relatively simple interfaces with the display and input/output devices, and a tape counter, a timer switch and other functions can be implemented in parallel relation to the tape measuring device.

Although a certain preferred embodiment of the present invention has been shown and described in detail, it should be understood that various changes and modifications may be made therein without departing from the scope of the appended claims.

What we claim is:

1. A method for measuring a running tape being transferred from a rotating supply reel to a rotating takeup reel, comprising the steps of:

approximately a plurality of straight lines to a characteristic curve indicative of a correlation between the ratio of the rotational periods of said supply and takeup reels and a remaining time or an elapsed time for the running tape;

generating clock pulses of a first frequency and other clock pulses having a plurality of frequencies, said first and respective ones of said plurality of frequencies having ratios corresponding to respective slopes of said plurality of straight lines;

generating signals indicative of the rotational periods of said supply and takeup reels; and measuring the remaining time or the elapsed time for the running tape by counting the product of said ratio of the rotational periods and the slopes of said straight lines by using said clock pulses and said signals.

* * * * *